Aug. 23, 1932.  F. HEHLGANS  1,873,646
APPARATUS FOR PHOTOGRAPHICALLY RECORDING SOUND
Filed Oct. 5, 1931.
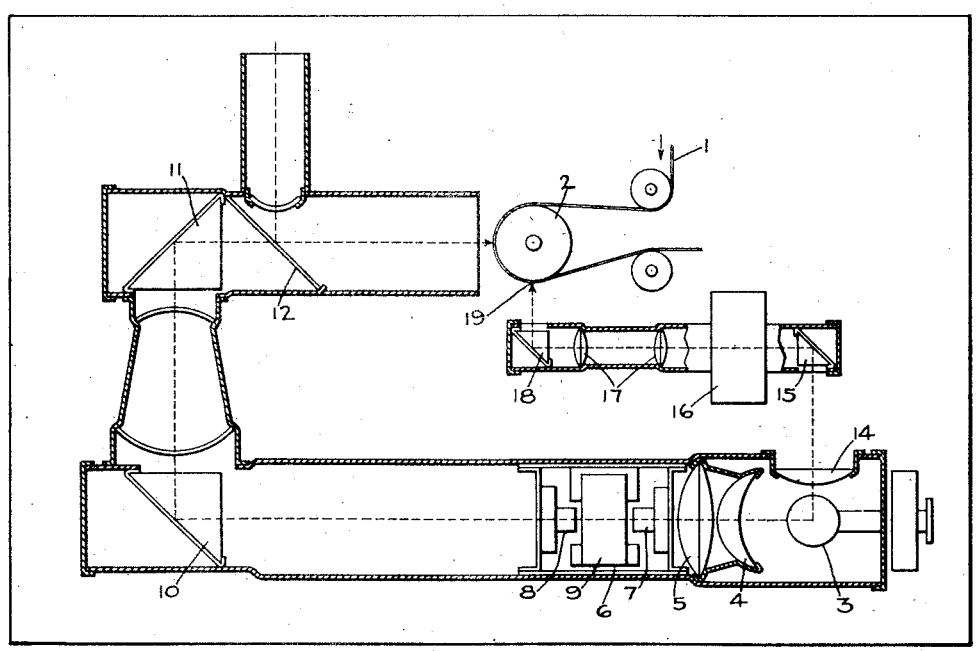
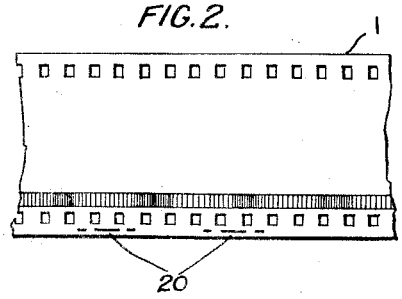
Inventor:
Friedrich Hehlgans,
by *Charles E. Mullen*
His Attorney.

Patented Aug. 23, 1932

1,873,646

UNITED STATES PATENT OFFICE

FRIEDRICH HEHLGANS, OF BERLIN-HERMSDORF, GERMANY, ASSIGNOR TO GENERAL ELECTRIC COMPANY, A CORPORATION OF NEW YORK

APPARATUS FOR PHOTOGRAPHICALLY RECORDING SOUND

Application filed October 5, 1931, Serial No. 567,011, and in Germany October 9, 1930.

My invention relates to apparatus for photographically recording sound on a moving light sensitive member and simultaneously making identification marks on the member. Such marks are useful in designating different sound recordings which may be made on the same film. They are also useful in assembling sound and picture negatives in the making of a combined print of such records, as explained for example in the Bullis Patent 1,335,651 and in the Williams Patent 1,389,407. It is the object of my invention to provide an improved apparatus of this character which is simple in construction, compact in form and inexpensive to manufacture.

My invention will be better understood from the following description taken in connection with the accompanying drawing, and its scope will be pointed out in the appended claims.

While my invention is applicable to various different forms of sound recording apparatus I have chosen to illustrate it as constituting a part of a common form of recording apparatus which employs a light source of constant intensity and varies a light beam therefrom for making the record by means of a Kerr cell. Referring now to the drawing, Fig. 1 illustrates such an embodiment of my invention and Fig. 2 shows a portion of the light sensitive member. This member 1, such for example as a film of the motion picture type, is shown supported by the roller 2 at the points at which the sound record and the identification marks are made. The member 1 is adapted to be driven at a uniform speed by suitable means not shown. Light for exposing the member 1 for the making of the sound record and the identification marks is supplied from the single light source 3 which may be an electric lamp which in the form illustrated is operated at a uniform brilliancy. For the recording of the sound, light rays from the lamp 3 after passing through the condensing lenses 4 and 5 pass through the sound control means 6, shown for example as comprising the Nicol prisms 7 and 8 between which is the Kerr cell 9. Beyond the apparatus 6 the light is refracted by the prism 10 to prism 11 from which it passes through the partially reflecting mirror 12 to the light sensitive member 1 upon which it is focused by suitable and well known means, not shown, to enable the recording of the sound waves.

From the same light source 3 light rays pass through the condensing lens 14 to prism 15, through control device 16, lenses 17 and prism 18 to the light sensitive member 1 engaging the same at the point 19. This point preferably is at a marginal portion of the member 1 or at least at some portion thereof not occupied by the sound record. The control member 16 may be any suitable device. It may be manually operated or, if preferred, may be automatically operated. The light flashes by which the identification marks are made under the control of member 16 may for example be in the form of dots and dashes as shown at 20 in accordance with a code such as the Morse code.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States is:

1. Apparatus for recording sound on a moving light sensitive member comprising a light source, means for directing light from said source on the member for recording sound and means for directing light from the same source on the member for producing identification marks thereon.

2. Apparatus for recording sound on a moving light sensitive member comprising a light source, means for variably exposing one portion of said member to light from said source in accordance with the sound to be recorded and means for exposing another portion of said member to light from said same source to produce identification marks thereon.

3. Apparatus for recording sound on a moving light sensitive member comprising a light source, means for varying a beam of light from said source in accordance with the sound waves and directing it upon the member, means for directing another beam from said source on said member and means for varying said other beam.

4. In apparatus for recording sound on one portion of a film including a light source and sound controlled means for varying a light beam from said source, marking means for said film comprising an optical system having a light controlling device arranged to project on another portion of said film another light beam from said source.

5. In apparatus for recording sound on one portion of a film including a light source and sound controlled means for varying a light beam from said source and means for producing identification marks on another portion of said film, said means comprising a lens and a prism for directing on said other portion a light beam from said source independent of said first beam.

In witness whereof, I have hereunto set my hand.

FRIEDRICH HEHLGANS.